United States Patent
Greenberger et al.

(10) Patent No.: US 11,164,026 B2
(45) Date of Patent: Nov. 2, 2021

(54) GRAPHICAL USER INTERFACE GENERATION BASED ON IMAGE ANALYSIS

(71) Applicant: INTERNATIONAL BUSINESS MACHINES CORPORATION, Armonk, NY (US)

(72) Inventors: Jeremy Adam Greenberger, San Jose, CA (US); Lisa Seacat DeLuca, Baltimore, MD (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 192 days.

(21) Appl. No.: 16/161,693

(22) Filed: Oct. 16, 2018

(65) Prior Publication Data
US 2020/0117938 A1    Apr. 16, 2020

(51) Int. Cl.
*G06K 9/32* (2006.01)
*G06K 9/00* (2006.01)
(Continued)

(52) U.S. Cl.
CPC ....... *G06K 9/3241* (2013.01); *G06K 9/00671* (2013.01); *G06Q 30/0631* (2013.01); *G06Q 30/0633* (2013.01); *G06T 11/60* (2013.01)

(58) Field of Classification Search
CPC ........... G06K 9/00671; G06K 9/00684; G06K 9/00711; G06K 9/00751; G06K 9/3241;
(Continued)

(56) References Cited

U.S. PATENT DOCUMENTS 9,407,816 B1    8/2016  Sehn
9,754,355 B2    9/2017  Chang et al.
(Continued)

FOREIGN PATENT DOCUMENTS

WO    WO 2015128758 A1    9/2015

OTHER PUBLICATIONS

Choi, et al., "Where to be wary: The impact of widespread photo-taking and image enhancement practices on users' geo-privacy," International Computer Science Institute, Berkeley, CA, USA, Mar. 4, 2016, 11 pages.

*Primary Examiner* — Kim Y Vu
*Assistant Examiner* — Michael J Vanchy, Jr.
(74) *Attorney, Agent, or Firm* — Stephanie Carusillo, Esq.; Wayne F. Reinke, Esq.; Heslin Rothenberg Farley & Mesiti P.C.

(57) ABSTRACT

A computer-implemented method of generating a graphical user interface based on image analysis is disclosed, the method including cognitively analyzing, by a data processing system, an image, which may be associated with a user, to identify item(s) in the image, obtaining, by the data processing system, available image filter(s) based on the identified item(s), presenting, by the data processing system, the available image filter(s) to the user, receiving, by the data processing system, a selection of an image filter from the one or more of the at image filter(s) from the user, and applying, by the data processing system, an image overlay to the image, the image overlay including the selection of an image filter as a selectable option. The available image filter(s) can be obtained by searching for them based on a relationship, by searching based on image filters associated with the identified item(s) or by using a cognitive suggestion service. In all cases, the results are compared to available image filter(s).

17 Claims, 13 Drawing Sheets

(51) Int. Cl.
*G06Q 30/06* (2012.01)
*G06T 11/60* (2006.01)

(58) Field of Classification Search
CPC ........... G06K 9/00288; G06K 9/00677; G06Q 50/01; G06Q 30/0631; G06Q 30/0633; G06F 3/0484; G06F 3/04845; G06F 40/166; G06F 40/169; H04N 2201/3245; G09G 2340/12; G06T 11/60; H04L 51/32
See application file for complete search history.

(56) References Cited

U.S. PATENT DOCUMENTS

| | | |
|---|---|---|
| 2014/0100997 A1* | 4/2014 | Mayerle ............. G06Q 30/0276 705/27.2 |
| 2015/0206349 A1 | 7/2015 | Rosenthal et al. |
| 2015/0356615 A1 | 12/2015 | Hagen et al. |
| 2016/0063600 A1* | 3/2016 | Wuang ............... G06Q 30/0631 705/26.7 |
| 2017/0177623 A1 | 6/2017 | Chen et al. |
| 2017/0206416 A1 | 7/2017 | Chen et al. |
| 2019/0197599 A1* | 6/2019 | Zia ......................... G06T 19/006 |
| 2019/0378204 A1* | 12/2019 | Ayush .................... G06Q 99/00 |

* cited by examiner

GRAPHICAL USER INTERFACE GENERATION BASED ON IMAGE ANALYSIS

BACKGROUND

Social media users have come to adopt image overlays. For example, a photograph of a birthday party may have an image (e.g., balloons) and/or text (e.g., Happy Birthday!) overlaid on the image taken for social media use. While entertaining, such use of image overlays does not assist the user or social media viewers in any practical way.

SUMMARY

Shortcomings of the prior art are overcome and additional advantages are provided through the provision, in one aspect, of a computer-implemented method of generating a graphical user interface based on image analysis. The method includes cognitively analyzing, by a data processing system, an image to identify at least one item in the image, resulting in at least one identified item. The method further includes obtaining, by the data processing system, at least one available image filter based on the at least one identified item, presenting, by the data processing system, one or more of the at least one available image filter to the user, receiving, by the data processing system, a selection of an image filter from the one or more of the at least one image filter from the user, and applying, by the data processing system, an image overlay to the image, resulting in a composite image, the image overlay including the selection of an image filter as a selectable option.

In another aspect, a system for generating a graphical user interface based on image analysis may be provided. The system may include, for example, memory(ies), at least one processor in communication with the memory(ies). Further, the system may include program instructions executable by the one or more processor via the memory(ies) to perform a method. The at least one processor and the memory(ies) are part of a data processing system. The method may include, for example, cognitively analyzing, by the data processing system, an image to identify at least one item in the image, resulting in at least one identified item. The method further includes obtaining, by the data processing system, at least one available image filter based on the at least one identified item, presenting, by the data processing system, one or more of the at least one available image filter to the user, receiving, by the data processing system, a selection of an image filter from the one or more of the at least one image filter from the user, and applying, by the data processing system, an image overlay to the image, resulting in a composite image, the image overlay including the selection of an image filter as a selectable option.

In a further aspect, a computer program product may be provided. The computer program product may include a storage medium readable by a processor and storing instructions for performing a method of generating a graphical user interface based on image analysis. The method may include, for example, cognitively analyzing, by a data processing system, an image to identify at least one item in the image, resulting in at least one identified item. The method further includes obtaining, by the data processing system, at least one available image filter based on the at least one identified item, presenting, by the data processing system, one or more of the at least one available image filter to the user, receiving, by the data processing system, a selection of an image filter from the one or more of the at least one image filter from the user, and applying, by the data processing system, an image overlay to the image, resulting in a composite image, the image overlay including the selection of an image filter as a selectable option.

Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1A:
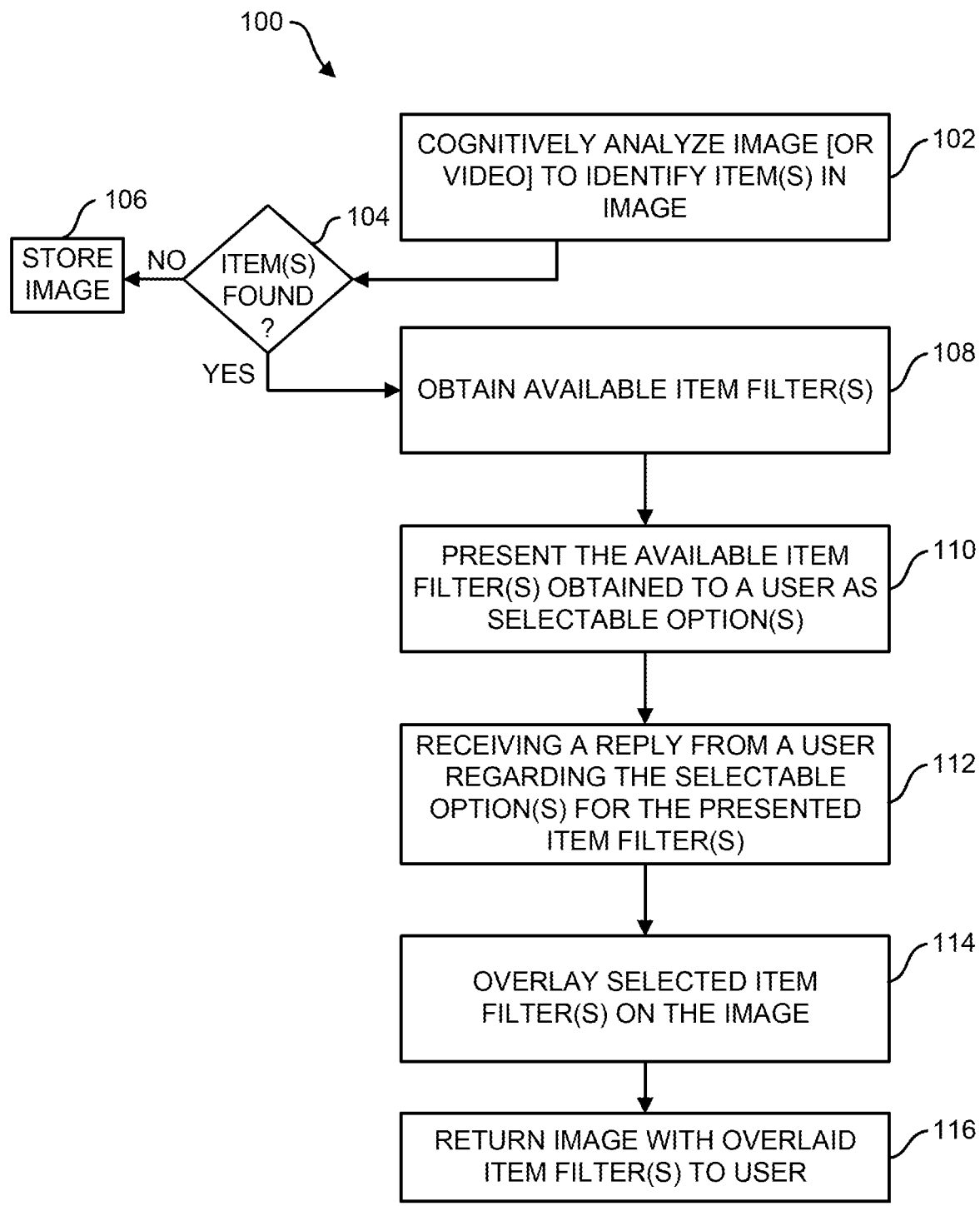
FIG. 1A is a flow diagram for a computer-implemented method of generating a graphical user interface based on cognitive analysis of an image to identify item(s) in the image, in accordance with one or more aspects of the present disclosure.
Figure 1B:
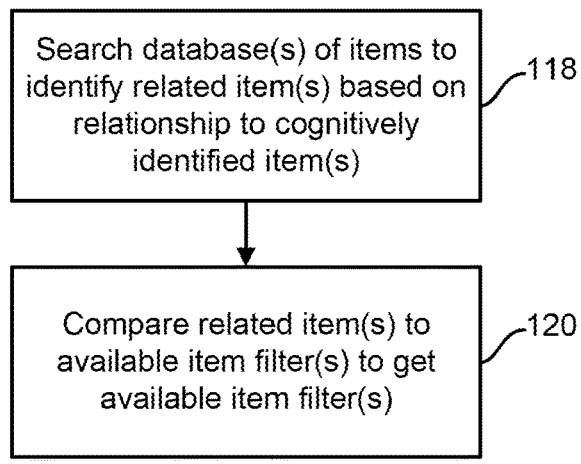
FIGS. 1B-1D are flow diagrams for examples of obtaining available image filter(s) in FIG. 1A, in accordance with one or more aspects of the present disclosure.
Figure 1C:
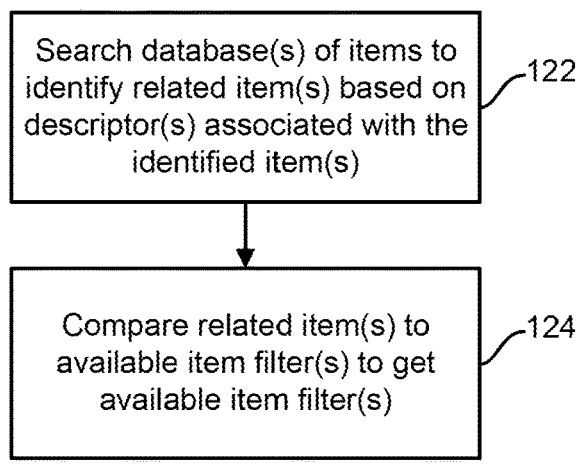
Figure 1D:
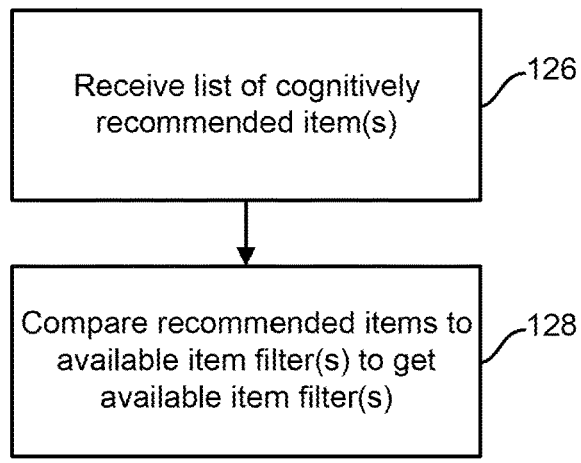

One or more aspects in this disclosure relate, in general, to image overlaying. More specifically, one or more aspects relate to generating a graphical user interface including an image overlay based on descriptor(s) of item(s) identified in an image.

Disclosed herein is a computer-implemented method, system and computer program product for generating a Graphical User Interface (GUI) based on cognitive analysis of an image to identify item(s) in the image that may be, for example, associated with the user. Generating the GUI may involve, for example, the use of image overlays (also referred to as "image filters" herein) overlaid on the image. The image is cognitively analyzed to identify one or more items in the image. The identified item(s) are used by the data processing system to obtain image filter(s). In one or more embodiment herein, descriptors associated with the identified item(s) are accessible to the system and used to search a database or catalog of image filters. In another embodiment, the image filter(s) are obtained by searching a database or catalog of image filters based on a relationship between the identified item(s) and the image filter(s). In yet another embodiment, the image filter(s) are obtained by the data processing system using a cognitive service to get suggested items and matching those to available image filter(s). The system then presents one or more of the image filter(s) obtained to the user, each being selectable by the user. Upon receiving a selection of image filter(s) from the user, the system overlays or applies the selected image filter(s) to the image, resulting in a composite image used for the GUI.

As used herein, the term "descriptor" and its formatives refers to descriptive element(s), for example, keyword(s), associated with item(s) identified in an image.

As used herein, the phrase "an image associated with a user" refers to a digital image the user currently takes or has access to (e.g., preexisting). The image may be, for example, one taken by the user, one with the user in the image, an image received by the user, or an image purchased or otherwise obtained by the user. The image may be stored locally to the user and/or remotely to the user. In one example, the image is or will be stored in a database associated with a social media or other online account of the user.

As used herein, the term "item(s)" with respect to any type of image (e.g., still, grouped or moving) refers to anything atimate or inatimate other than a human that is shown in an image. Examples of items that may be found in images include, but are not limited to, a hat, a piece of clothing, accessories, shoes, a non-human animal or other non-human life form, food, flowers, foliage, trees, a landscape, a car, etc.

As used herein, the term "image filter(s)" refers to image(s) of item(s) associated with item(s) identified by a data processing system cognitively analyzing an image to identify item(s) in the image.

As used herein, the term "cognitively analyzing" refers to the use of cognitive computing in analyzing an image to determine item(s) in the image. Cognitive computing is the simulation of human thinking, using software and/or hardware, which may be enhanced/improved using machine learning. Machine learning is based in mathematics and statistical techniques, giving computer systems the ability to "learn" with data provided, e.g., a relatively large amount of data, without the need to be explicitly programmed. The goal of cognitive computing is to create automated systems capable of solving problems without human assistance, broadly referred to as Artificial Intelligence (AI).

Machine learning is useful in the context of this disclosure to improve the cognitive analysis of images to identify item(s) therein for generating an improved GUI the user might find useful. The improved GUI is used to convey information to the user (predicted to be pertinent). Data that may be used for the machine learning includes, for example, images, item(s) identified in the images, metadata associated with the images and/or items identified in the image, which may include, for example, properties of the images, when the image was taken/created and/or descriptors of items in the images. Such data may, for example, be stored in a database, which may be used for periodic re-learning, including data stored since the last machine learning session.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience.

As used herein, the term "real-time" refers to a period of time necessary for data processing and presentation to a user to take place, and which is fast enough that a user does not perceive any significant delay. Thus, "real-time" is from the perspective of the user.

As used herein, the term "live image" refers to an image currently taken and not preexisting.

FIG. 1A is a flow diagram 100 of one example of a computer-implemented method of generating a Graphical User Interface (GUI) based on cognitive analysis of an image to identify item(s) in the image. The method includes cognitively analyzing 102, by a data processing system (or "system"), an image associated with a user to identify item(s) in the image. In one example, the system uses visual recognition to help identify item(s) in the image. Visual recognition refers to the use of cognitive computing to identify item(s) in an image. Visual recognition can employ specialized recognition technologies. In one example, visual recognition may be performed using an API (Application Programming Interface) to access a visual recognition service. The service uses, for example, deep learning algorithms to identify items and/or people in an image. The service's response includes, for example, keywords that provide information about the content of an image. The image may include metadata identifying, for example, properties of the image (e.g., size), a location where the image was taken, a date the image was taken and a user rating of the image, to name a few. In one example, the metadata may also include descriptor(s) of the item(s) in the image. This metadata may be used by the data processing system to, for example, help identify item(s) in the image. If no item(s) are found 104 in the image, the system may, for example, store 106 the image and notify the user in some manner that no item(s) were identified (e.g., a message indicating no item(s) were found). If item(s) are found in the image, the system obtains image filter(s) 108 based on, for example, descriptor(s) of each item found, a relationship between the image filter(s) and the identified item(s) or via a cognitive item suggestion service. For example, if a hat is identified in the image, descriptors of the hat may include, for example, a type of hat (e.g., a baseball cap) and/or a color(s) of the hat (e.g., black and red) and/or any text on the hat (e.g., a sports team name). The system then presents 110 the available image filter(s) to the user, via the generated GUI, the image filter(s) each being a selectable item, such that the user determines which, if any, image filter(s) are overlaid on the image. In an alternate embodiment, the image filter(s) may be chosen by the data processing system.

The item descriptor(s) may also include a relationship between an item identified in the image by the data processing system and the image filter(s). For example, the image filter may be an item commonly purchased with the identified item. In this regard, there may, in one example, or may, in another example, not be a way for the user and/or recipients to purchase item(s) of available image filter(s). As another example, the image may be a photograph of one or more people, including the user, and the image filter may be an item in common between two or more other people in the photograph aside from the user. As another example, the image filter may be an item "liked" by one or more friends of the user, or liked by one or more people to whom the image is sent. As still another example, an image filter may be in a marketing campaign with one or more item(s) identified in the image by the system.

Making each image filter selectable can be accomplished in various different ways. In one example, an image of each item in the image filter is shown to the user on a device with a display (e.g., a smartphone) and the user simply selects their item choice(s) (e.g., touching an item image on a touch display). In another example, a "button" accompanies each item image presented to the user. The buttons can take any shape or form and any color(s) and size(s). Further, the button may include text, either the same or different text for each item. In one example, the buttons may be elongated, horizontal ovals with the word "select" within the button. In another example, the button is circular and red with no text. Once the user has selected their choices(s) for image filter(s), a corresponding reply is received by the system, the reply including the image filter choice(s) 112.

In response to receiving the reply from the user, the system overlays the selected image filter(s) 114 on the image and returns 116 the image with overlaid image filter(s) to the user. In one example, the user sends the image with overlaid image filter(s) to one or more friends and/or family, or simply posts it to a social media account of the user. The selectable option and/or the overlay may further include, for example, an option to obtain further information about the item(s), an option to add the item(s) to a list of the user (e.g., a wish list or a gift list), an option to purchase the item(s), an option to like, not like and/or share the image item(s), if, for example, the image is associated with a social media account of the user. The possible options may be presented to the user for selection consideration in various ways, for example, word(s), button, icons, a drop-down selection or other selector.

In one example, the image is associated with a social media account of a user. Items in the mage may include, for example, items commonly found in social media images or video posts of users, such as, for example, any of the item examples provided herein.

In one example, a cognitive computer system performs the cognitive analysis of the image. In general, the term "cognitive computing" (CC) has been used to refer to new hardware and/or software that mimics the functioning of the human brain and helps to improve human decision-making, which can be further improved using machine learning. In this sense, CC is a new type of computing with the goal of more accurate models of how the human brain/mind senses, reasons, and responds to stimulus. CC applications link data analysis and adaptive page displays (AUI) to adjust content for a particular type of audience. As such, CC hardware and applications strive to be more effective and more influential by design.

Some common features that cognitive systems may express include, for example: ADAPTIVE—they may learn as information changes, and as goals and requirements evolve. They may resolve ambiguity and tolerate unpredictability. They may be engineered to feed on dynamic data in real time, or near real time; INTERACTIVE—they may interact easily with users so that those users can define their needs comfortably. They may also interact with other processors, devices, and Cloud services, as well as with people; ITERATIVE AND STATEFUL—they may aid in defining a problem by asking questions or finding additional source input if a problem statement is ambiguous or incomplete. They may "remember" previous interactions in a process and return information that is suitable for the specific application at that point in time; and CONTEXTUAL—they may understand, identify, and extract contextual elements such as meaning, syntax, time, location, appropriate domain, regulations, user's profile, process, task and goal. They may draw on multiple sources of information, including both structured and unstructured digital information, as well as sensory inputs (e.g., visual, gestural, auditory and/or sensor-provided).

The image overlay(s) may be obtained by the system, for example, from a database or catalog of available item overlays using, in one example, descriptor(s) associated with the identified item(s). Descriptor(s) of item(s) identified in the image may include, for example, a type of item (e.g., a piece of clothing), a brand of the item, a size of the item (e.g., large) and a color of the item. In another example, the descriptor(s) are part of metadata associated with the image. The identified item(s) may be related to available image overlays (or "image filters" as used herein) based on a relationship. The relationship may include, for example, items commonly seen or purchased together, items that people in the image or video have in common, items liked by friends and/or family, including, for example, items liked or purchased by people to whom the image or video is sent from a social media account of a user and items that are the subject of one or more marketing campaigns. Image filter(s) may be with regard to availability, or, in an alternate embodiment, without regard to availability. In one example, the item(s) of the image filter(s) are presented as available for purchase. In another embodiment, the data processing system uses a cognitive suggestion service to receive 126 therefrom a list of suggested items. The system may then, for example, compare 128 the cognitively suggested item(s) to available image filter(s) for matches that can then be presented to the user.

In one embodiment, for any information needed to be understood from text, for example, social media posts, Natural Language Understanding (previously known as Natural Language Processing) and Natural Language Classification can be used.

The umbrella term "Natural Language Understanding" can be applied to a diverse set of computer applications, ranging from small, relatively simple tasks such as, for example, short commands issued to robots, to highly complex endeavors such as, for example, the full comprehension of newspaper articles or poetry passages. Many real world applications fall between the two extremes, for example, text classification for the automatic analysis of emails and their routing to a suitable department in a corporation does not require in-depth understanding of the text, but it does need to work with a much larger vocabulary and more diverse syntax than the management of simple queries to database tables with fixed schemata.

Regardless of the approach used, most natural language understanding systems share some common components. The system needs a lexicon of the language and a parser and grammar rules to break sentences into an internal representation. The construction of a rich lexicon with a suitable ontology requires significant effort, for example, the WORDNET lexicon required many person-years of effort. WORDNET is a large lexical database of English. Nouns, verbs, adjectives and adverbs are grouped into sets of cognitive synonyms (synsets), each expressing a distinct concept. Synsets are interlinked by means of conceptual-semantic and lexical relations. The resulting network of meaningfully related words and concepts can be navigated, for example, with a browser specially configured to provide the navigation functionality. WORDNET's structure makes it a useful tool for computational linguistics and natural language processing.

WORDNET superficially resembles a thesaurus, in that it groups words together based on their meanings. However, there are some important distinctions. First, WORDNET interlinks not just word forms—strings of letters—but specific senses of words. As a result, words that are found in close proximity to one another in the network are semantically disambiguated. Second, WORDNET labels the semantic relations among words, whereas the groupings of words in a thesaurus does not follow any explicit pattern other than meaning similarity.

The system also needs a semantic theory to guide the comprehension. The interpretation capabilities of a language understanding system depend on the semantic theory it uses. Competing semantic theories of language have specific trade-offs in their suitability as the basis of computer-automated semantic interpretation. These range from naive semantics or stochastic semantic analysis to the use of pragmatics to derive meaning from context.

Advanced applications of natural language understanding also attempt to incorporate logical inference within their framework. This is generally achieved by mapping the derived meaning into a set of assertions in predicate logic, then using logical deduction to arrive at conclusions. Therefore, systems based on functional languages such as the Lisp programming language need to include a subsystem to represent logical assertions, while logic-oriented systems such as those using the language Prolog, also a programming language, generally rely on an extension of the built-in logical representation framework.

A Natural Language Classifier, which could be a service, for example, applies cognitive computing techniques to return best matching predefined classes for short text inputs, such as a sentence or phrase. It has the ability to classify phrases that are expressed in natural language into categories. Natural Language Classifiers ("NLCs") are based on Natural Language Understanding (NLU) technology (previously known as "Natural Language Processing"). NLU is a field of computer science, artificial intelligence (AI) and computational linguistics concerned with the interactions between computers and human (natural) languages.

For example, consider the following questions: "When can you meet me?" or When are you free?" or "Can you meet me at 2:00 PM?" or "Are you busy this afternoon?" NLC can determine that they are all ways of asking about "setting up an appointment." Short phrases can be found in online discussion forums, emails, social media feeds, SMS messages, and electronic forms. Using, for example, an NLU service, one can send text from these sources to a natural language classifier trained using machine learning techniques. The classifier will return its prediction of a class that best captures what is being expressed in that text. Based on the predicted class one can trigger an application to take the appropriate action such as providing an answer to a question, suggest a relevant product based on expressed interest or forward the text to an appropriate human expert who can help.

Applications of such APIs include, for example, classifying email as SPAM or No-SPAM based on the subject line and email body; creating question and answer (Q&A) applications for a particular industry or domain; classifying news content following some specific classification such as business, entertainment, politics, sports, and so on; categorizing volumes of written content; categorizing music albums following some criteria such as genre, singer, and so on; combining the Watson Natural Language Classifier service with the Watson Conversation service if one wants their application to engage in a conversation with a user; and classifying frequently asked questions (FAQs).

Figure 2:
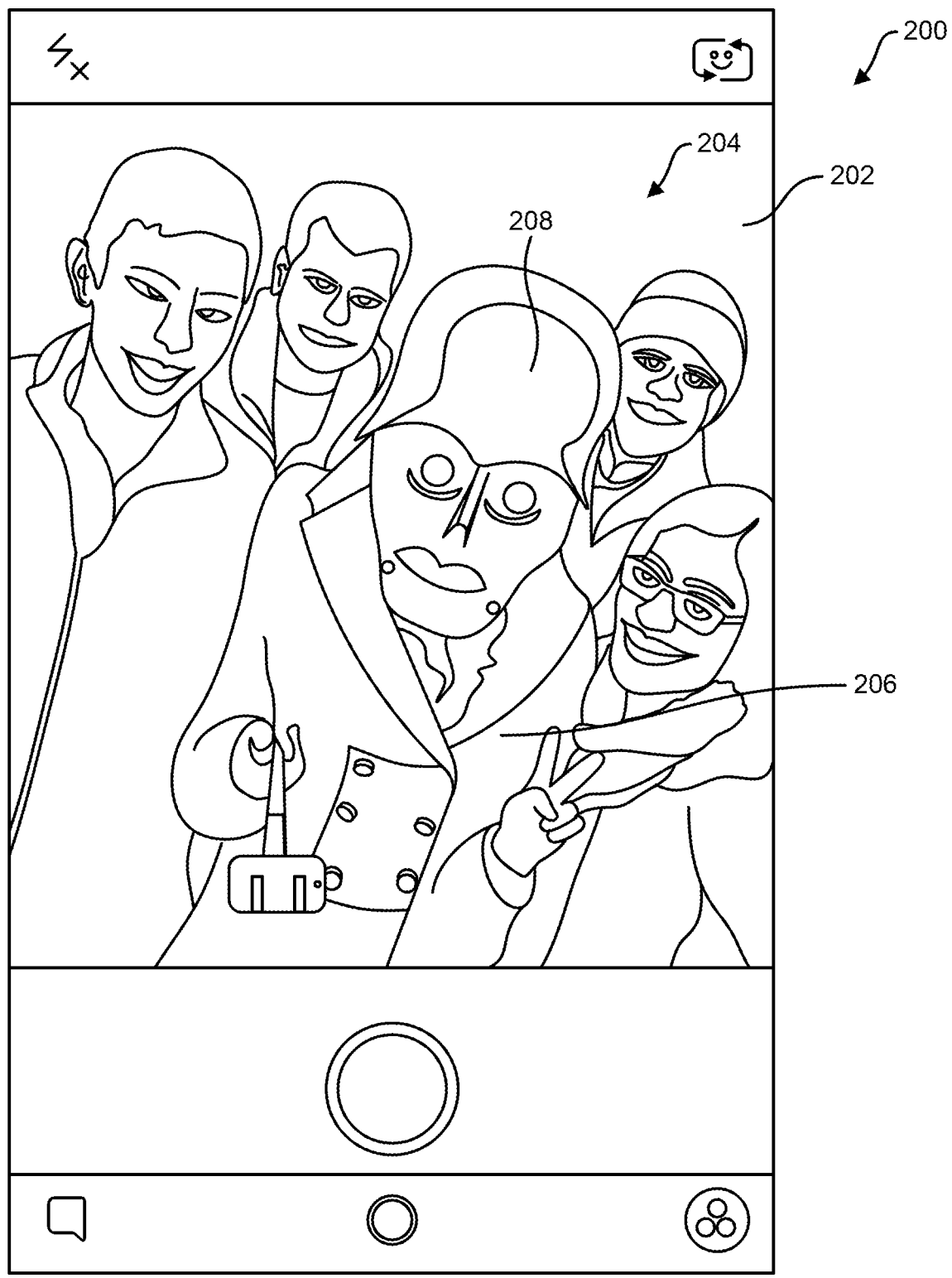
FIG. 2 depicts one example of a social media photograph displayed on a smartphone, the photograph including a group of people, one of which is wearing a mask of a popular movie character, in accordance with one or more aspects of the present disclosure.

In one example, described with respect to FIG. 2, a photograph 202 (e.g., a group "selfie") displayed on a display of a personal computing device (e.g., smartphone) 200 includes a number of friends 204 with a user 206 in the middle. The photograph may be taken, for example, while using a social media account of the user or the photograph could be preexisting, either on the smartphone, with subsequent uploading, or already uploaded. The user in this example has on a helmet/mask 208 of a popular character from one or more movies. In response to user input indicating user interest in seeing image filter(s) (e.g., swiping to the right or left), the system identifies the helmet/mask and, for example, associated with the helmet/mask is one or more descriptor(s) (e.g., keywords), for example, associated with the helmet/mask in a database or catalog, or, for example, found in the metadata of the image. The system may use the one or more descriptors to search for items related to the helmet/mask. In an alternative embodiment, there are no descriptor(s) and the system searches based on a relationship between the helmet/mask and the image filter(s). In yet another alternative embodiment, instead of descriptor(s) or a relationship, the data processing system uses a cognitive suggestion service to receive a list of cognitively suggested item(s), which the system can compare to available image filter(s). All matches may then, for example, be presented to the user in a GUI.

Figure 3:
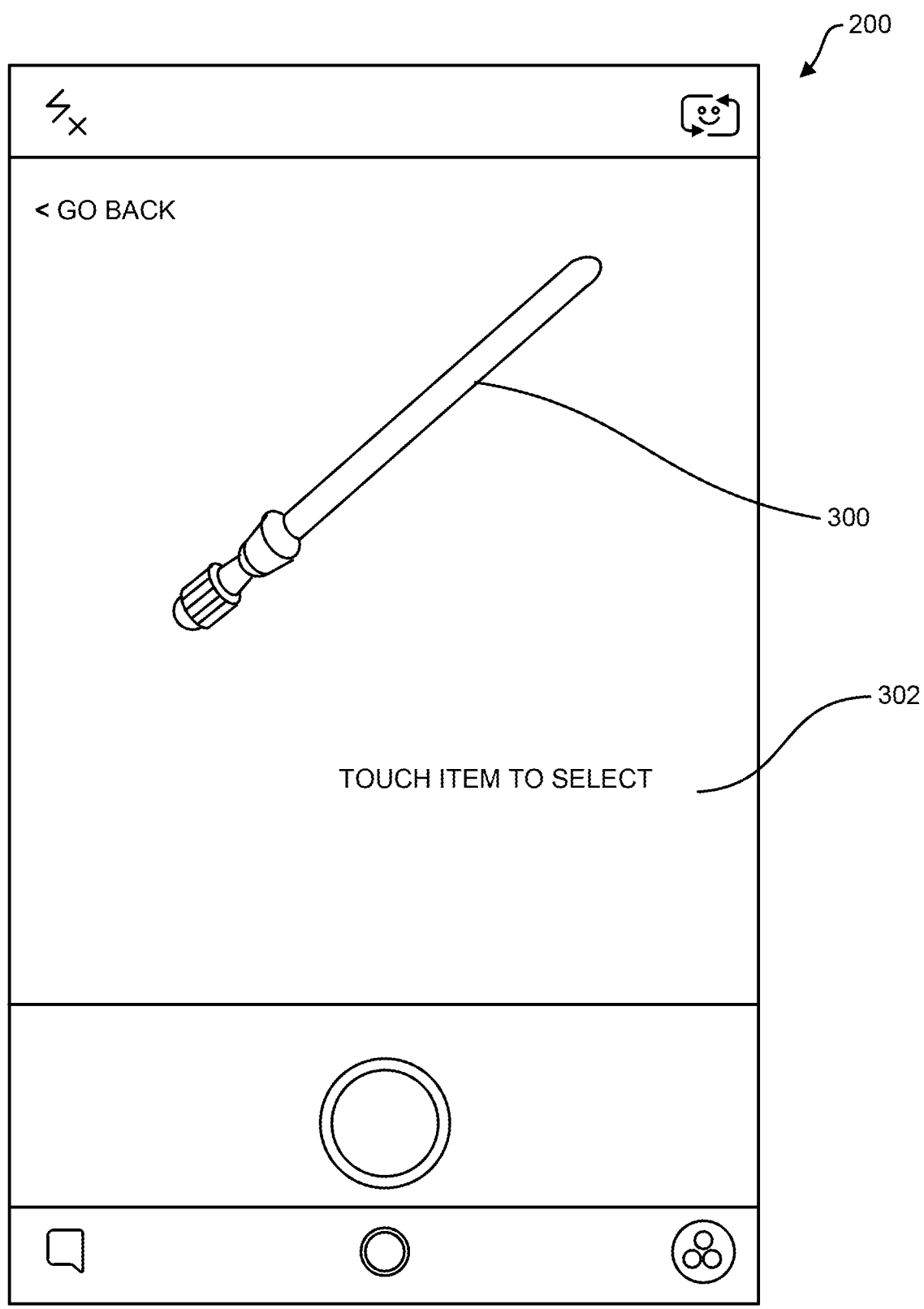
FIG. 3 depicts one example of an image displayed on the smartphone of FIG. 2, the image being of an image filter, in this case, a sword used by the popular movie character, together with a way to select the image filter for overlaying on the social media the photograph of FIG. 2, in accordance with one or more aspects of the present disclosure.
Figure 4:
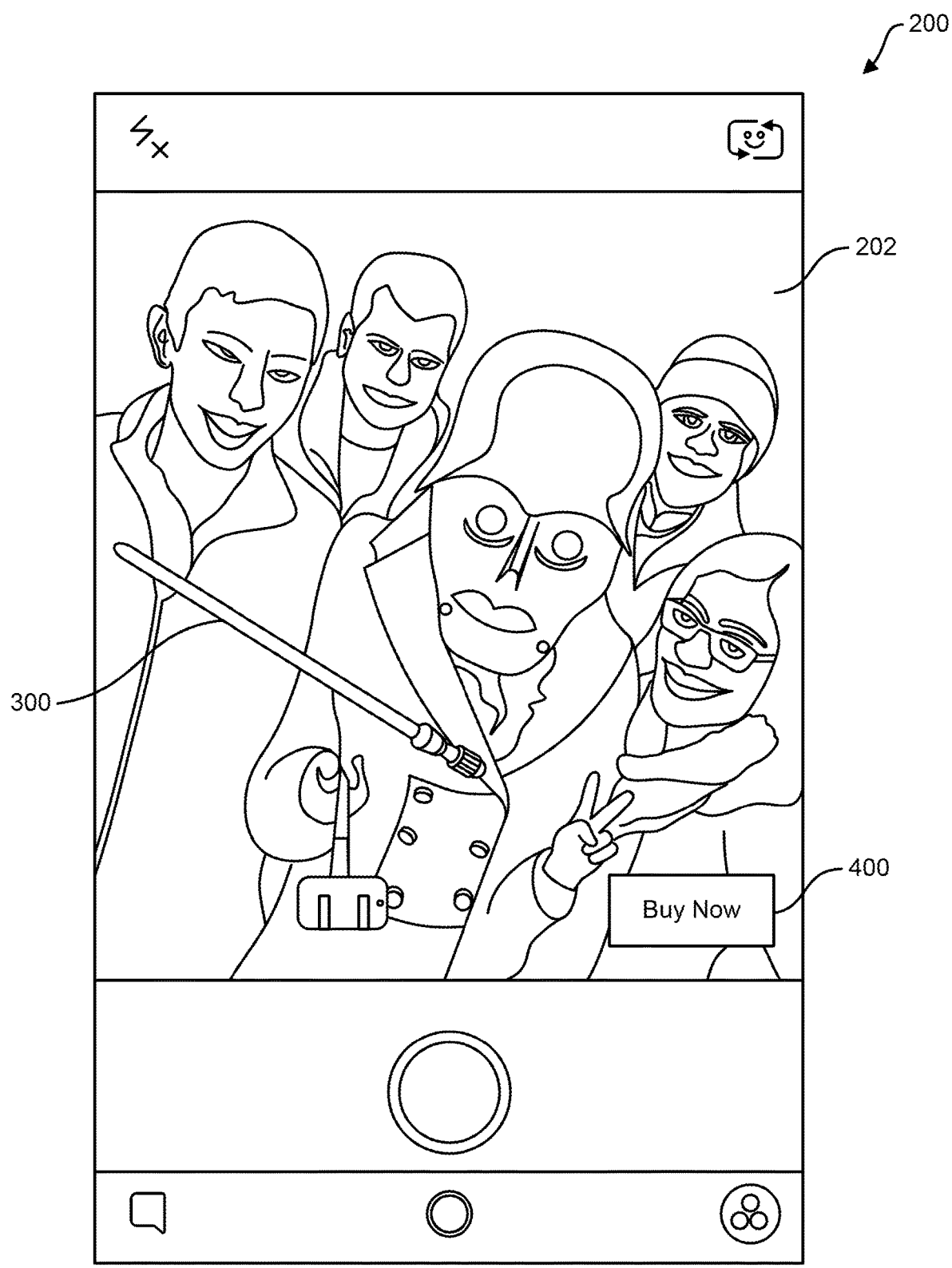
FIG. 4 depicts one example of the photograph of FIG. 2 displayed on the display of the smartphone of FIG. 2 with the selected image filter overlaid on the photograph, in accordance with one or more aspects of the present disclosure.

In the example of FIG. 3, an image of a sword 300 used by the movie character in one or more movies is presented to the user as a selectable option 302 for overlaying on the photograph, creating a composite image. In one example, as shown in FIG. 3, the selectable option takes the form of touching the sword image. In another example, there is a selectable button in close proximity to the sword image with the word "select" or similar therein. Upon the user selecting the sword option, the system overlays the sword on the photograph, as shown in FIG. 4. In this example, the system also optionally overlays a "buy now" button 400 enabling selection of the sword for purchase. In one example, the selection for purchase may be with regard, or, in another example, without regard, to availability of the sword.

Figure 5:
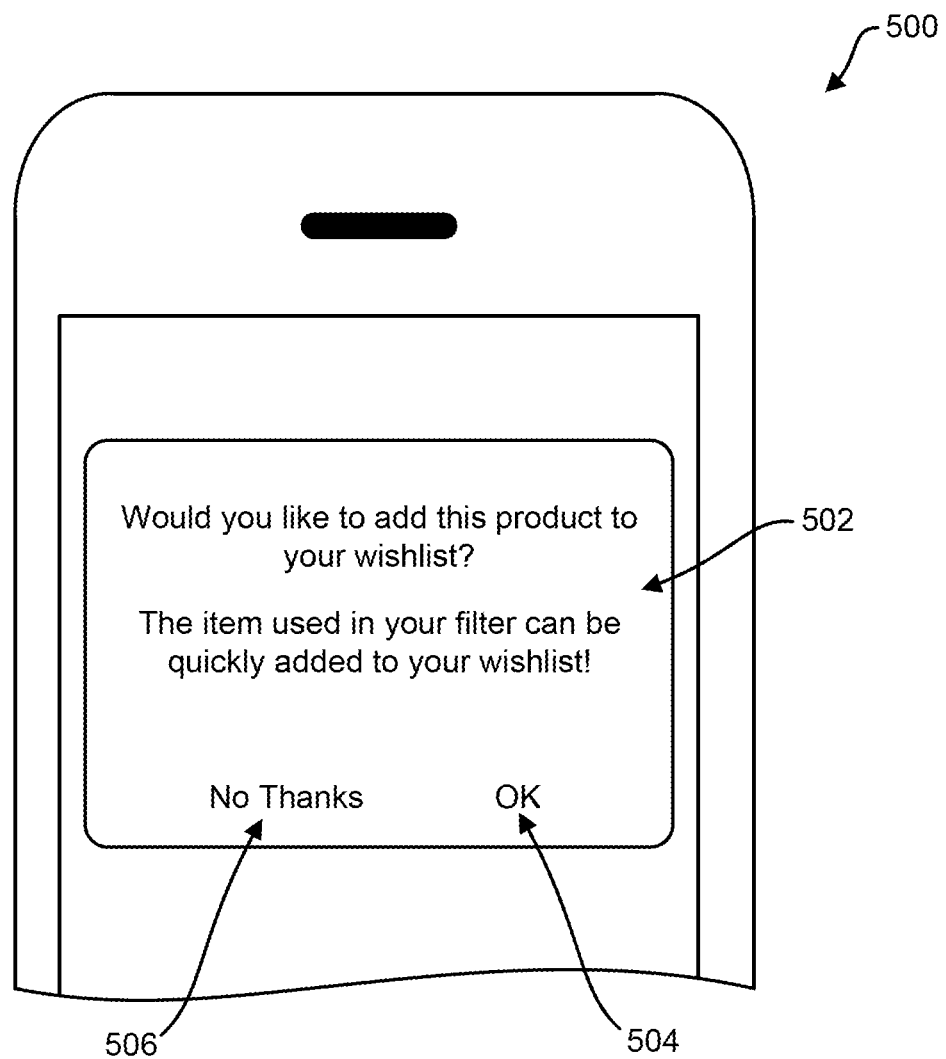
FIG. 5 depicts one example of a portion of a smartphone display with text asking if the user would like to add the item of the image filter of FIGS. 3 and 4 to a wish list for future consideration, with yes/no options, in accordance with one or more aspects of the present disclosure.

FIG. 5 depicts one example of a portion 500 of a smartphone display with text 502 inquiring if the user would like to add an item shown in an image filter to a wish list. It need not be a wish list, it could be other types of lists, for example, a "watching" list, a list with a registry (e.g., wedding registry), a gift list for gifts to others, etc. Also shown is an accept element 504, here, text "OK" and a reject element 506, here, text "No Thanks." It will be understood that other types of accept/reject elements could be used, for example, buttons, icons, as well as being any size that will reasonably fit in the display area.

Figure 6:
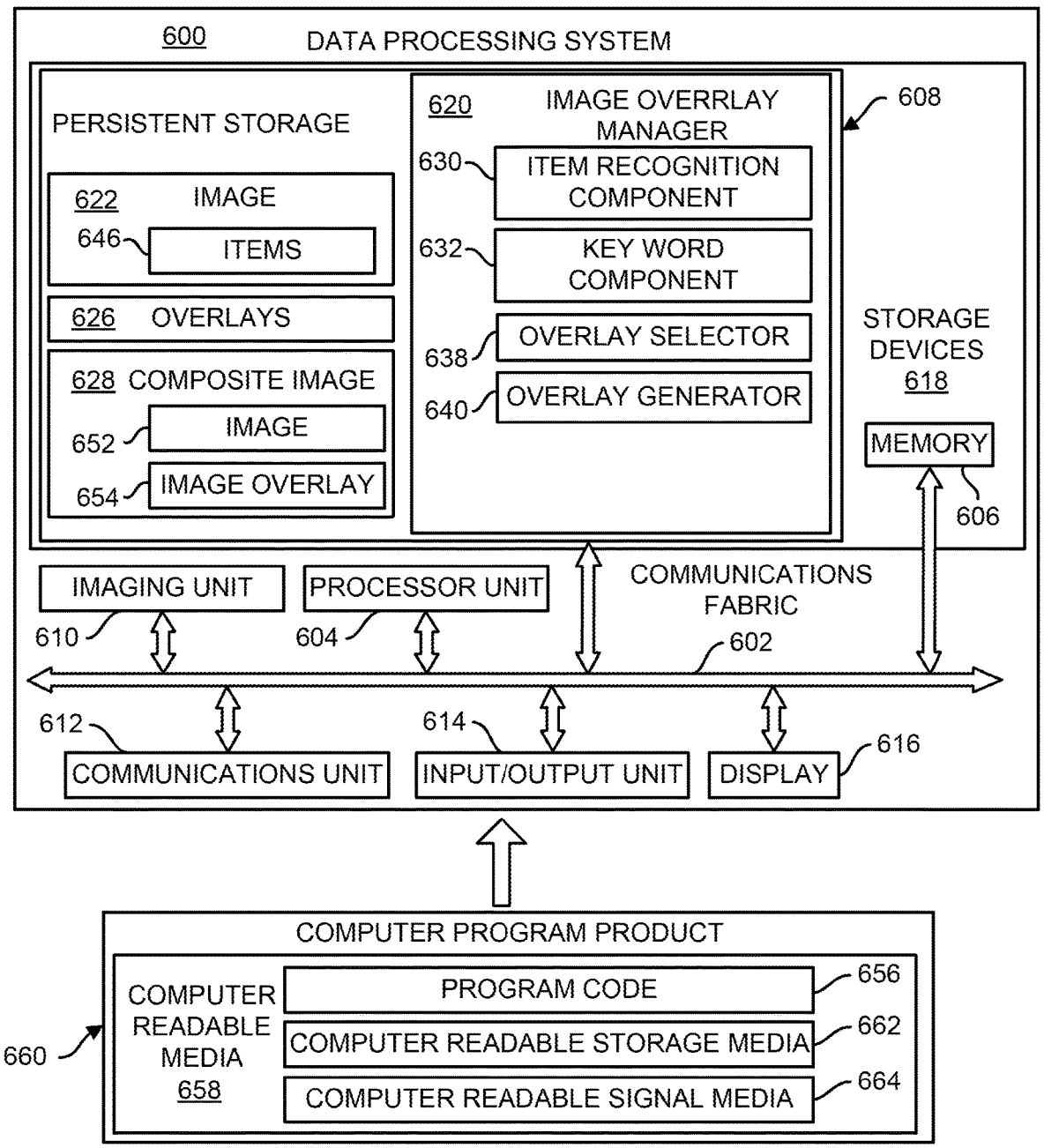
FIG. 6 is a block diagram of one example of a data processing system configured to implement one or more aspects of the computer-implemented method of FIG. 1A, in accordance with one or more aspects of the present disclosure.

With reference now to FIG. 6, a block diagram of one example of a data processing system 600, in which computer readable program code or program instructions implementing processes of examples of aspects of the present disclosure may be located. Data processing system 600 includes, for example, communications fabric 602, which provides communications between processing unit 604, memory 606, persistent storage 608, imaging unit 610, communications unit 612, input/output unit 614, and display 616.

Processing unit 604 serves to execute instructions for software applications and programs that may be loaded into memory 606. Processing unit 604 may be a set of one or more hardware processor devices or may be a multi-processor core, depending on the particular implementation. Further, processing unit 604 may be implemented using one or more heterogeneous processor systems, in which a main processor is present with secondary processors on a single chip. As another example, processing unit 604 may be a symmetric multi-processor system containing multiple processors of the same type.

Memory 606 and persistent storage 608 are examples of storage devices 618. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 606, in these examples, may be, for example, a random access memory, or any other suitable volatile or non-volatile storage device. Persistent storage 608 may take various forms, depending on the particular implementation. For example, persistent storage 608 may contain one or more devices. For example, persistent storage 608 may be a hard drive, a flash memory, a rewritable optical disk, a rewritable magnetic tape, or some combination of the above. The media used by persistent storage 608 may be removable. For example, a removable hard drive may be used for persistent storage 608.

In this example, persistent storage 608 stores image overlay manager 620, image 622, profile 624, overlays 626, and composite image 628. Image overlay manager 620 selects and applies image overlays to images, including preexisting images and newly captured images, based on image overlay manager 620 identifying items in the images. It should be noted that even though image overlay manager 620 is shown as residing in persistent storage 608. In an alternative example, image overlay manager 620 may be a separate component of data processing system 600. For example, image overlay manager 620 may be a hardware component coupled to communication fabric 602 or a combination of hardware and software components. In another alternative example, image overlay manager 620 may be located in a server device. In a further alternative example, a first set of components of image overlay manager 620 may be located locally in data processing system 600 and a second set of components may be located remotely in a server device.

In this example, image overlay manager 620 includes item recognition component 630, keyword component 632, overlay selector 638 and overlay generator 640. However, it should be noted that embodiments disclosed herein are merely examples and are not limited to such descriptions. In other words, image overlay manager 620 may include more or fewer components than illustrated.

Image overlay manager 620 utilizes item recognition component 630 to identify item(s) 646 in image 622. Image 622 may be, for example, a still photograph or a frame of a video.

Image overlay manager 620 utilizes overlay selector 638 to analyze the output of item analyzing component 636 and select one or more image overlays from a group of overlays 626 stored, for example, in an electronic catalog or database. Overlays 626 represent a plurality of stored image overlays that may be applied to images, such as image 622, based on item(s) identified in the image of interest. Alternatively, image overlay manager 620 may utilize overlay generator 640 to analyze the output of item analyzing component 636 and generate a new image overlay for image 622 based on selected content from two or more different overlays in the group of overlays 626.

Composite image 628 comprises image 652 and image overlay 654. Image 652 is the same as image 622. Image overlay manager 620 generates composite image 628 by combining image 652 with image overlay 654. After generating composite image 628, image overlay manager 620 displays composite image 652 in display 616 for review by the user of data processing system 600. Image overlay manager 620 also may include an accept element and a reject element in the display for selection by the user. If the user selects the accept element, then image overlay manager 620 saves composite image 628. If the user selects the reject element, then image overlay manager 620 removes image overlay 654 from image 652. After removing image overlay 654 from image 652, image overlay manager 620, for example, selects a new set of image overlays for image 652.

Imaging unit 610 may be, for example, a hardware device capable of capturing still and/or video images. Imaging unit 610 may be, for example, a stand-alone digital camera or, as another example, a component of a personal computing device (e.g., a smartphone or tablet). Also, it should be noted that imaging unit 610 may include, for example, a set of two or more imaging devices.

Communications unit 612, in this example, provides for communication with other computers, data processing systems, and devices via a network, such as, for example, a network. Communications unit 612 may provide communications using one or both of physical and wireless communications links. The physical communications link may utilize, for example, a wire, cable, universal serial bus, or any other physical technology to establish a physical communications link for data processing system 600. The wireless communications link may utilize, for example, shortwave, high frequency, ultra-high frequency, microwave, wireless fidelity (Wi-Fi), Bluetooth technology, global system for mobile communications (GSM), code division multiple access (CDMA), second-generation (2G), third-generation (3G), fourth-generation (4G), 4G Long Term Evolution (LTE), LTE Advanced, fifth-generation (5G) or any other wireless communication technology or standard to establish a wireless communications link for data processing system 600.

Input/output unit 614 allows for the input and output of data with other devices that may be connected to data processing system 600. For example, input/output unit 614 may provide a connection for user input through a keypad, keyboard, and/or some other suitable input device. Display 616 provides one example of a mechanism to display information to a user and may include touch screen capabilities to allow the user to make on-screen selections through user interfaces or input data, for example. Display 616 also may display images, such as photographs and videos with or without image overlays, to the user.

Instructions for the operating system, applications, and/or programs may be located in storage devices 618, which are in communication with processing unit 604 through communications fabric 602. In this example, the instructions are in a functional form on persistent storage 608. These instructions may be loaded into memory 606 for running by processing unit 604. The processes of the different embodiments may be performed by processing unit 604 using computer implemented program instructions, which may be located in a memory, such as memory 606. These program instructions are referred to as program code, computer usable program code, or computer readable program code that may be read and run by a processor in processing unit 604. The program code, in the different embodiments, may be embodied on different physical computer readable storage devices, such as memory 606 or persistent storage 608.

Program code 656 is located in a functional form on computer readable media 658 that is selectively removable and may be loaded onto or transferred to data processing system 600 for running by processing unit 604. Program code 656 and computer readable media 658 form computer program product 660. In one example, computer readable media 658 may be computer readable storage media 662 or computer readable signal media 664. Computer readable storage media 662 may include, for example, an optical or magnetic disc that is inserted or placed into a drive or other device that is part of persistent storage 608 for transfer onto a storage device, such as a hard drive, that is part of persistent storage 608. Computer readable storage media 662 also may take the form of a persistent storage, such as a hard drive, a thumb drive, or a flash memory that is connected to data processing system 600. In some instances, computer readable storage media 662 may not be removable from data processing system 600.

Alternatively, program code 656 may be transferred to data processing system 600 using computer readable signal media 664. Computer readable signal media 664 may be, for example, a propagated data signal containing program code 656. For example, computer readable signal media 664 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the examples. The computer readable media also may take the form of non-tangible media, such as communication links or wireless transmissions containing the program code.

In some embodiments, program code 656 may be downloaded over a network to persistent storage 608 from another device or data processing system through computer readable signal media 664 for use within data processing system 600. For instance, program code stored in a computer readable storage media in a data processing system may be downloaded over a network from the data processing system to data processing system 600. The data processing system providing program code 656 may be a server computer, a client computer, or some other device capable of storing and transmitting program code 656.

The different components illustrated for data processing system 600 are not meant to provide architectural limitations to the manner in which different embodiments may be implemented. The different embodiments may be implemented in a data processing system including components in addition to, or in place of, those illustrated for data processing system 600. Other components shown in FIG. 6 can be varied from the examples shown. The different embodiments may be implemented using any hardware device or system capable of executing program code. As one example, data processing system 600 may include organic components integrated with inorganic components and/or may be comprised entirely of organic components excluding a human being. For example, a storage device may be comprised of an organic semiconductor.

As another example, a computer readable storage device in data processing system 600 is any hardware apparatus that may store data. Memory 606, persistent storage 608, and computer readable storage media 662 are examples of physical storage devices in a tangible form.

In another example, a bus system may be used to implement communications fabric 602 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 606 or a cache such as found in an interface and memory controller hub that may be present in communications fabric 602.

Figure 7A:
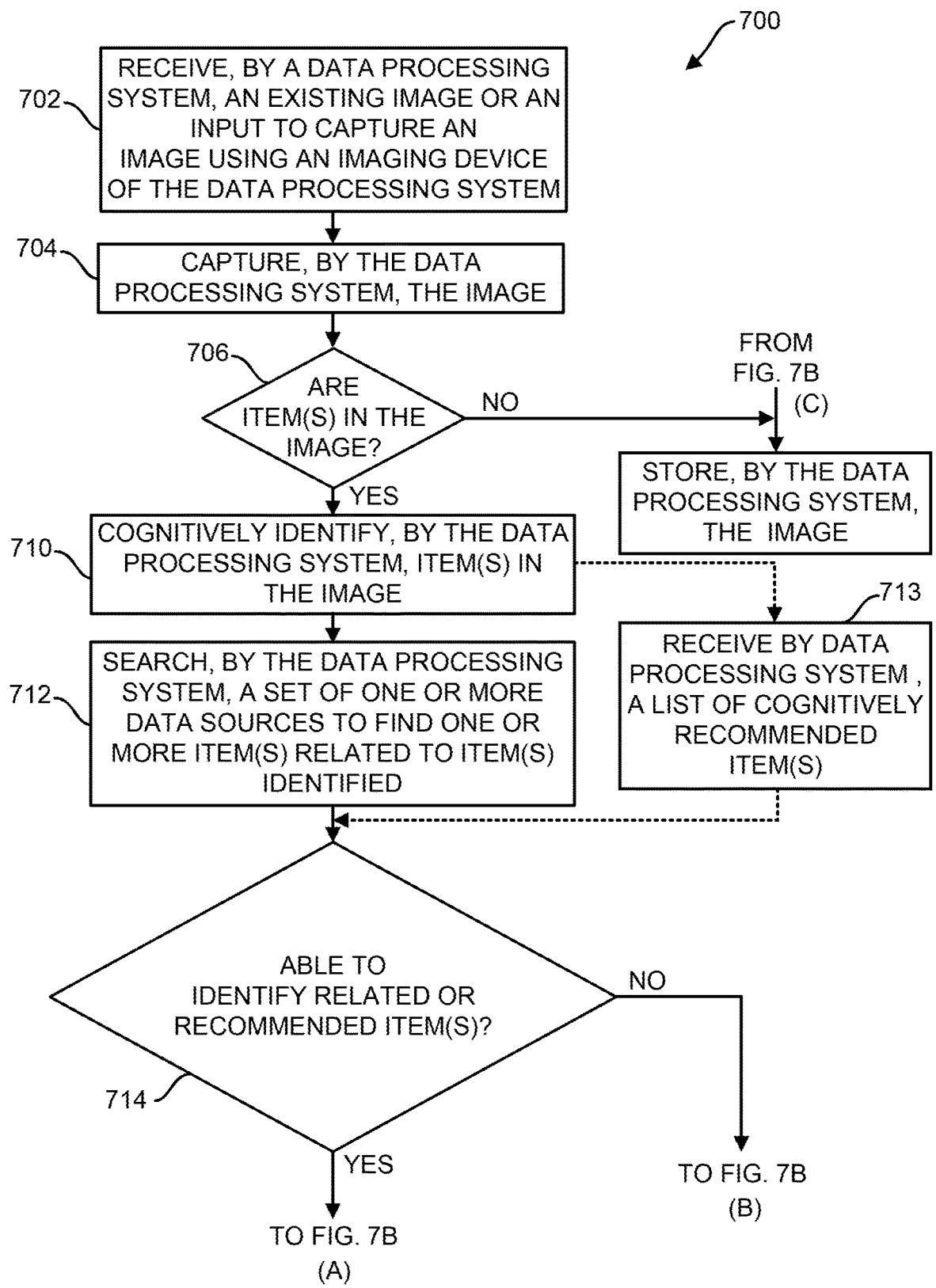
FIGS. 7A and 7B together comprise a flow diagram of one example of an image overlay process, in accordance with one or more aspects of the present disclosure.
Figure 7B:
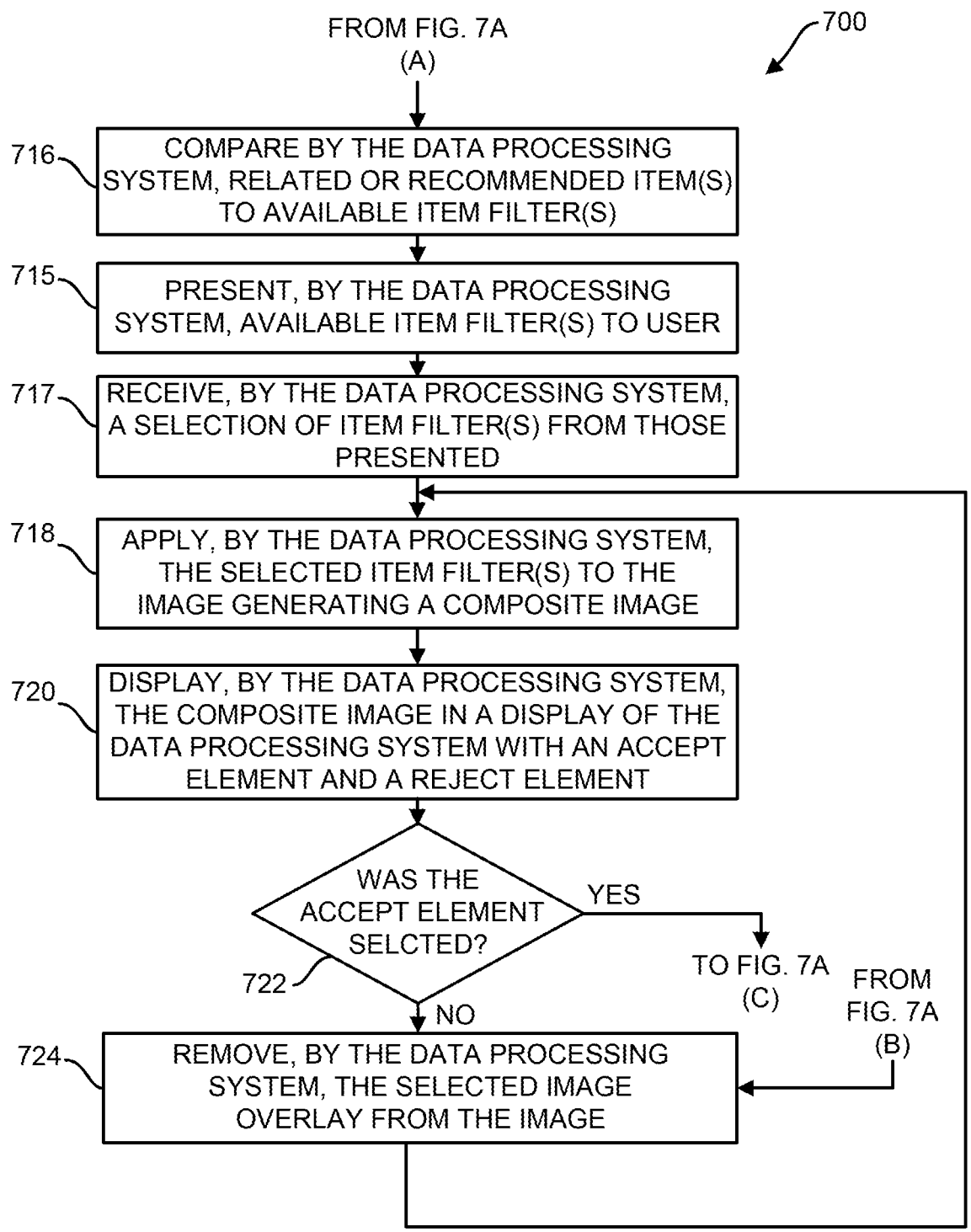

With reference now to FIGS. 7A-7B, collectively presented is a flow diagram 700 of one example of a process for applying an image overlay to an image, in accordance with one or more aspects of the present disclosure. The process shown in FIGS. 7A-7B may be implemented in a data processing system, such as, for example, data processing system 600 in FIG. 6 or others described herein.

The process begins when the data processing system receives a request to capture 702 an image using an imaging device of the data processing system. In an alternate embodiment, an existing image is used, for example, an existing image stored and associated with a user's social media account. The imaging device may be, for example, imaging unit 610 in FIG. 6. Alternatively, the process may begin, for example, when the data processing system receives a request to begin from the user, along with identification of an existing image to use. In response to receiving the input, the data processing system captures 704 the image, such as image 622 in FIG. 6.

Subsequently, the data processing system makes a determination 706 as to whether any item(s) are in the image. If the data processing system determines that no items are in the image, the "no" output, then the data processing system may, for example, end the process after optionally storing 708 the image if it was not preexisting.

If the data processing system determines that item(s) are in the image, the "yes" output of determination 706, then the data processing system cognitively analyzes 710 the image for item(s) in the image, the identified item(s) being associated with one or more descriptors. As used herein, the term "descriptor(s)" refers to anything used to describe identified items in an image. In one example, the descriptor(s) can take the form, for example, of keyword(s). The descriptor(s) may, for example, be associated with the identified item(s) in various ways. For example, the descriptor(s) could be stored in a database with the image filter(s). As another example, the descriptors can be in metadata accompanying the image. In addition, the data processing system searches 712 a set of one or more data sources to find one or more related item(s) based on the identified item(s), for example, searching based on the descriptor(s). The set of data sources may include, for example, a catalog or database of image filters. In another example, searching for related item(s) can be based on, for example, a relationship with the identified items. In still another example, instead of searching, the system utilizes a cognitive suggestion service to get a list of cognitively suggested item(s).

Afterward, the data processing system makes a determination 714 as to whether the data processing system is able to identify related (based on descriptors or a relationship) or cognitively suggested item(s) based on the item(s) identified in the image. If the data processing system is able to identify related items, a "yes" output of determination 714, then the data processing system selects one or more image filter(s) to present to the user. The user makes and the system receives a selection of image filter(s) from those presented. Further, the data processing system applies 718 the selected image overlay(s) to the image, generating a composite image, such as composite image 628 in FIG. 6.

The data processing system may then display 720 the composite image to the user in a display of the data processing system, or a device connected to the data processing system, with an accept element and a reject element for the user. The data processing system makes a determination 722 as to whether the accept element was selected. If the data processing system determines that the accept element was selected, a "yes" output of determination 722, then the process returns to FIG. 7A where the data processing system stores 708 the composite image. If the data processing system determines 722 that the reject element was selected, a "no" output of determination 722, then the data processing system, in one example, removes 724 the selected image filter(s) or image overlay(s) from the image.

Returning again to the determination 714 whether related item(s) were identified, if the data processing system is not able to identify related item(s), a "no" output for determination 714, then, in one example, the data processing system may suggest one or more alternative image filter(s) to apply to the image. The suggested alternative image filter(s) may be, for example, one or more general or generic image overlays or a set of default image overlays. Alternatively, the suggested alternative image overlays may be based on one or more other factors, such as, for example, geographic location of where the image was captured. Subsequently, as above, the data processing system receives a selection, if any, of one or more of the suggested image overlay(s) to apply to the image. Thereafter, the data processing system applies the selected image overlay to the image.

Figure 8:
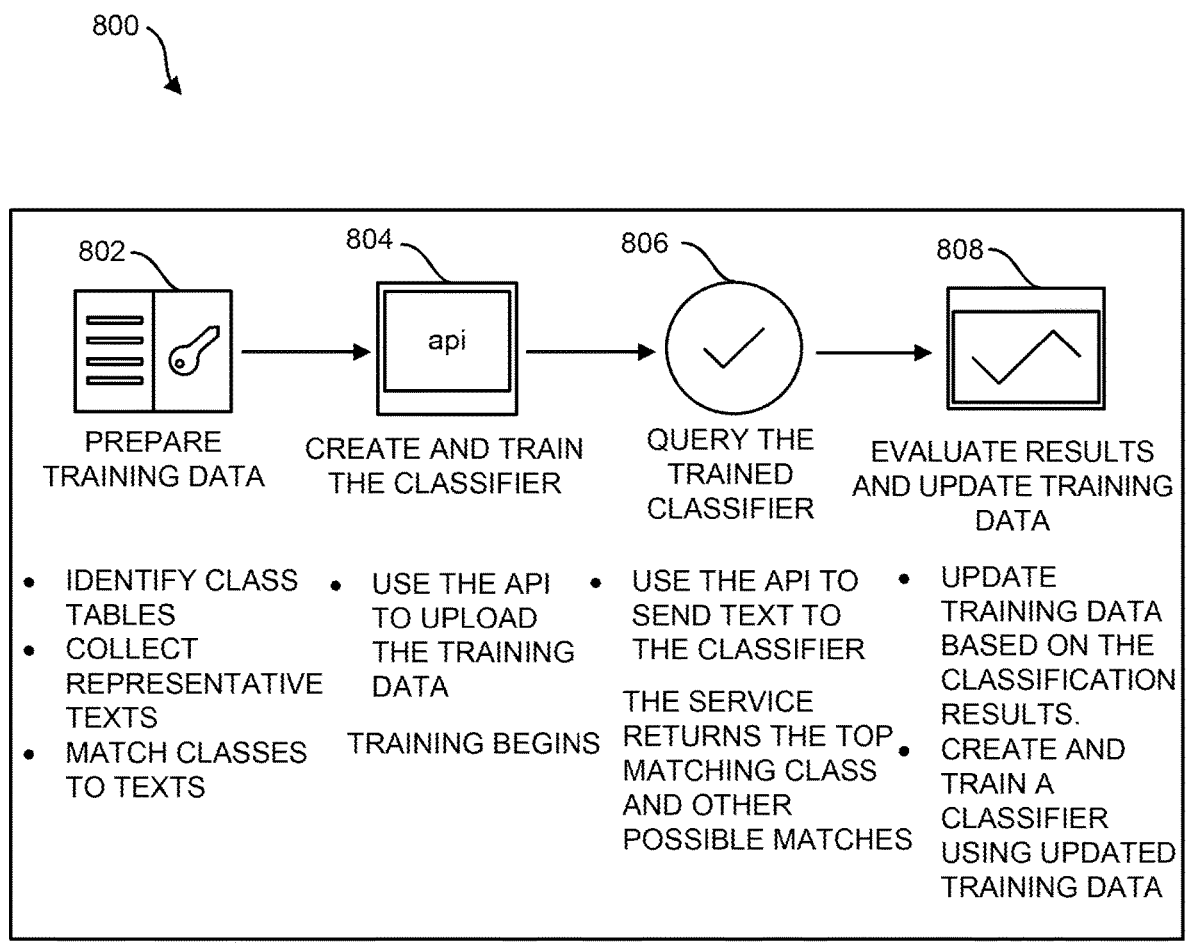
FIG. 8 is a modified flow diagram of one example of training a data processing system, in accordance with one or more aspects of the present disclosure.

FIG. 8 is a hybrid flow diagram 800 of one example of an overview of the basic steps for creating and using a natural language classifier service. Initially, training data for machine learning is prepared, 802, by identifying class tables, collecting representative texts and matching the classes to the representative texts. An API (Application Planning Interface) may then be used to create and train the classifier 804 by, for example, using the API to upload training data. Training may begin at this point. After training, queries can be made to the trained natural language classifier, 806. For example, the API may be used to send text to the classifier. The classifier service then returns the matching class, along with other possible matches. The results may then be evaluated and the training data updated, 808, for example, by updating the training data based on the classification results. Another classifier can then be trained using the updated training data.

A data processing system, as described herein, can run a Natural Language Understanding (NLU) process for determining one or more NLU output parameter of a message. An NLU process can include, for example, one or more of a topic classification process that determines topics of messages and output one or more topic NLU output parameter, a sentiment analysis process which determines sentiment parameter for a message, e.g. polar sentiment NLU output parameters, "negative," "positive," and/or non-polar NLU output sentiment parameters, e.g. "anger," "disgust," "fear," "joy," and/or "sadness" or other classification process for output of one or more other NLU output parameters e.g. one of more "social tendency" NLU output parameter or one or more "writing style" NLU output parameter.

By running an NLU process, the data processing system can perform a number of processes including one or more of (a) topic classification and output of one or more topic NLU output parameter for a received message (b) sentiment classification and output of one or more sentiment NLU output parameter for a received message or (c) other NLU classifications and output of one or more other NLU output parameter for the received message.

Topic analysis for topic classification and output of NLU output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLU parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader).

In one example, sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Certain embodiments herein may offer various technical computing advantages involving computing advantages to address problems arising in the realm of computer networks. Particularly, computer networks operating to generate a graphical user interface (GUI) based on cognitive analysis of an image to identify item(s) in the image, which in one example, are related in some manner to item(s) in image overlay(s) or image filter(s). Various decision data structures can be used to drive artificial intelligence (AI) decision making, such as a decision data structure that cognitively analyzes an image for item(s) in the image. In addition, a data structure can be used with respect to the item(s) and matched to one or more available overlays or image filter(s) for the image, each image filter including an image of an item and a selector. In another example, a decision data structure can be used for a service that performs the cognitive image analysis to identify item(s) in the image. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources that process radio signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making.

Various decision data structures can be used to drive artificial intelligence (AI) decision making, such as decision data structure that cognitively analyzes an image to identify one or more items in the image, in order to suggest one or more image overlays to add to the image. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms.

For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources that process radio or other signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making.

Various decision data structures can be used to drive artificial intelligence (AI) decision making, such as decision data structure that cognitively analyzes an image to identify one or more items in the image, in order to suggest one or more image overlays to add to the image. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms.

For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources that process radio or other signals for location determination of users. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making.

The suggested image overlay(s) passed to the user (those that match available image filter(s)) need not be one step of displaying the image filters, but instead may be, for example, in the form of an initial push message (with or without an image or video component) or updated website or app interaction. Periodically, the suggestions and user choices may then be stored (e.g., in a database) and used to retrain the system and create a new cross co-occurrence (CCO) model and matrices to drive the suggestions or recommendations using existing software.

In one example, a simple co-occurrence algorithm may be described using an equation:

$$r=[A^tA]h_a$$

where "r" is a recommendation; "ha" is a user's history of some primary action (e.g., a purchase history); "A" is a history of all users' image filter selections and, in one example, matrix "AtA" compares column to column using, for example, a log-likelihood based correlation test. In addition, all information known about a user (e.g., in-venue behaviors) can be used to find correlations between different selections, known as a cross-occurrence, information such as, for example, purchase behavior, view behavior, category-preference, location-preference, device-preference, etc. For example, the basic equation can be expanded for different behaviors:

$$r=[A^tA]h_a+[A^tB]h_b+[A^tC]h_c$$

where $h_a$-$h_c$ are user histories of different primary actions or behaviors.

In one embodiment, a system to facilitate a computer-implemented method of providing cognitive item recommendations can include at a high level, for example, a front end, a back end, a backbone and a search engine. A "front end" in this context refers to an intake module for user selections and related data. In one example, the front end can be, for example, a distributed linear algebra framework and mathematically expressive domain specific language. It serves as a scalable machine-learning library. A "back end" in this context refers to a cluster-computing framework; it is a general purpose "big data" processing engine. Some common uses of such a back end include, for example, interactive queries across large data sets and machine learning. A "backbone" in this context refers to software for use with big data analytics. A "search engine" in this context refers to a large-scale enterprise search platform.

The information may also include, for example, a location of the user, user identification and/or item descriptors. In real-time, cognitive suggestions may be provided to the user in some matter, for example, via some type of display, e.g., a screen of a smartphone or tablet, a mirror or fixed display within the venue closest to the user. In one example, if interested in a received recommendation, the user may indicate so (e.g., by touch) to the display and the image filter may be provided in some fashion to the user, for example, the same display.

The system may be trained using machine learning and user selection data. As the database grows, periodic repeating of machine learning may be done to further train (or retrain) the system and create new cross co-occurrence model and matrices to drive suggestions.

In one example, the providing in the computer-implemented method of the first aspect may include, for example, searching cross co-occurrence matrix(es) to predict image filter selections, the cross co-occurrence matrix(es) used in making the cognitive recommendation(s).

Thus, embodiments disclosed herein provide a computer-implemented method, data processing system, and computer program product for selecting, recommending, and applying an image overlay to an image based on item(s) identified in the image. The descriptions of the various embodiments disclosed herein have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

In a first aspect, disclosed herein is a computer-implemented method of generating a GUI by cognitively analyzing an image to identify item(s) therein. The computer-implemented method includes cognitively analyzing, by a data processing system, an image to identify item(s) in the image, resulting in identified item(s), The image may be, for example, be associated with a user. The method further includes obtaining, by the data processing system, available image filter(s) based on the identified item(s), presenting, by the data processing system, one or more of the available image filter(s) to the user, receiving, by the data processing system, a selection of an available image filter(s) from the user, and applying, by the data processing system, an image overlay to the image, resulting in a composite image, the image overlay including the selection of the image filter as a selectable option.

In one example, the identified item(s) in the computer-implemented method of the first aspect may be, for example, associated with descriptor(s), and the obtaining may include, for example, searching, by the data processing system, database(s) of items to identify related item(s) based on descriptor(s), and comparing, by the data processing system, the related item(s) to one or more available image filter(s), resulting in available image filter(s). In one example, the descriptor(s) may include, for example, at least one of brand, size, color, product name and type.

In one example, the image in the computer-implemented method of the first aspect may be, for example, preexisting.

In one example, the cognitively analyzing in the computer-implemented method of the first aspect may include, for example, using visual recognition.

In one example, the obtaining may include, for example, searching, by the data processing system, database(s) of items to identify related item(s) based on a relationship with the identified item(s), and comparing, by the data processing system, the related item(s) to available image filter(s), resulting in available image filter(s).

In one example, the selectable option in the computer-implemented method of the first aspect may further include, for example, at least one of obtaining further information about an image filter, adding an image filter to a list, sharing an image filter and liking an image filter on social media. In one example, the image overlay may further include, for example, at least one of a selector for further information, a selector for adding the image filter to a list, a selector for sharing the image filter and/or a selector for liking the image filter.

In one example, the obtaining in the computer-implemented method of the first aspect may include, for example, receiving, by the data processing system, a list of cognitively recommended item(s), and comparing, by the data processing system, the cognitively recommended item(s) to one or more available image filter(s), resulting in available image filters.

In one example, the selectable option in the computer-implemented method of the first aspect may further include, for example, purchasing an item of the image filter, and the image overlay may further include, for example, a selector for purchasing the item of the image filter.

In a second aspect, disclosed above is a system for generating a GUI by cognitively analyzing an image to identify item(s) therein. The system includes a memory, and processor(s) in communication with the memory to perform a method, the method including cognitively analyzing, by the system, an image associated with a user to identify item(s) in the image, resulting in identified item(s), obtaining, by the system, available image filter(s) based on the identified item(s), presenting, by the system, one or more of the available image filter(s) to the user, receiving, by the system, a selection of an image filter from the one or more of the image filter(s) from the user, and applying, by the system, an image overlay to the image, resulting in a composite image, the image overlay including the selection of an image filter as a selectable option.

The identified item(s) in the system of the second aspect may be, for example, associated with descriptor(s), and the obtaining may include, for example, searching, by the data processing system, database(s) of items to identify related item(s) based on descriptor(s), and comparing, by the data processing system, the related item(s) to available image filter(s), resulting in available image filter(s). In one example, the descriptor(s) may include, for example, at least one of brand, size, color, product name and type.

In one example, the obtaining in the system of the second aspect may include, for example, searching, by the data processing system, database(s) of items to identify related item(s) based on a relationship with the identified item(s), and comparing, by the data processing system, the related item(s) to available image filter(s), resulting in available image filter(s).

In one example, the obtaining in the system of the second aspect may include, for example, receiving, by the data processing system, a list of cognitively recommended item(s), and comparing, by the data processing system, the cognitively recommended item(s) to available image filter(s), resulting in available image filter(s).

In a third aspect, disclosed above is a computer program product. The computer program product includes a storage medium readable by a processor and storing instructions for performing a method of generating a GUI by image analysis to identify item(s) in the image, the method including cognitively analyzing, by a data processing system, an image associated with a user to identify item(s) in the image, resulting in identified item(s), obtaining, by the data processing system, available image filter(s) based on the identified item(s), presenting, by the data processing system, one or more of the available image filter(s) to the user, receiving, by the data processing system, a selection of an image filter(s) from the one or more of the image filter(s) from the user, and applying, by the data processing system, an image overlay to the image, resulting in a composite image, the image overlay including the selection of an image filter as a selectable option.

In one example, the identified item(s) in the computer program product of the third aspect may be, for example, associated with descriptor(s), and the obtaining may include, for example, searching, by the data processing system, database(s) of items to identify related item(s) based on one descriptor(s), and comparing, by the data processing system, the related item(s) to available image filter(s), resulting in available image filter(s). In one example, the descriptor(s) of the computer program product of the third aspect may include, for example, at least one of brand, size, color, product name and type.

In one example, the obtaining in the computer program product of the third aspect may include, for example, searching, by the data processing system, database(s) of items to identify related item(s) based on a relationship with the identified item(s), and comparing, by the data processing system, the related item(s) to available image filter(s), resulting in available image filter(s).

The obtaining in the computer program product of the third aspect may include, for example, receiving, by the data processing system, a list of cognitively recommended item(s), and comparing, by the data processing system, the cognitively recommended item(s) to available image filter(s), resulting in available image filter(s).

Figure 9:
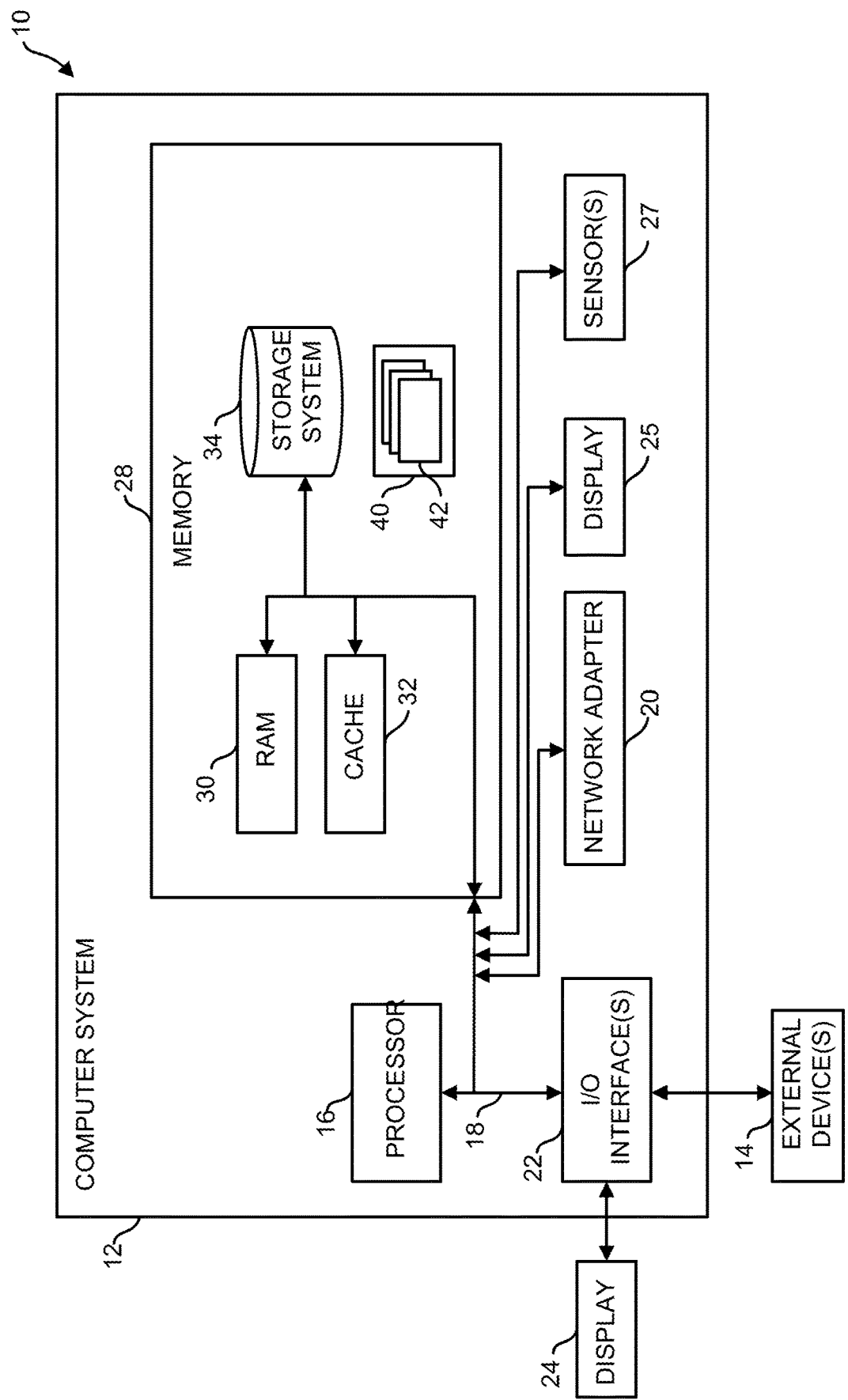
FIG. 9 is a block diagram of one example of a computer system, in accordance with one or more aspects of the present disclosure.
Figure 10:
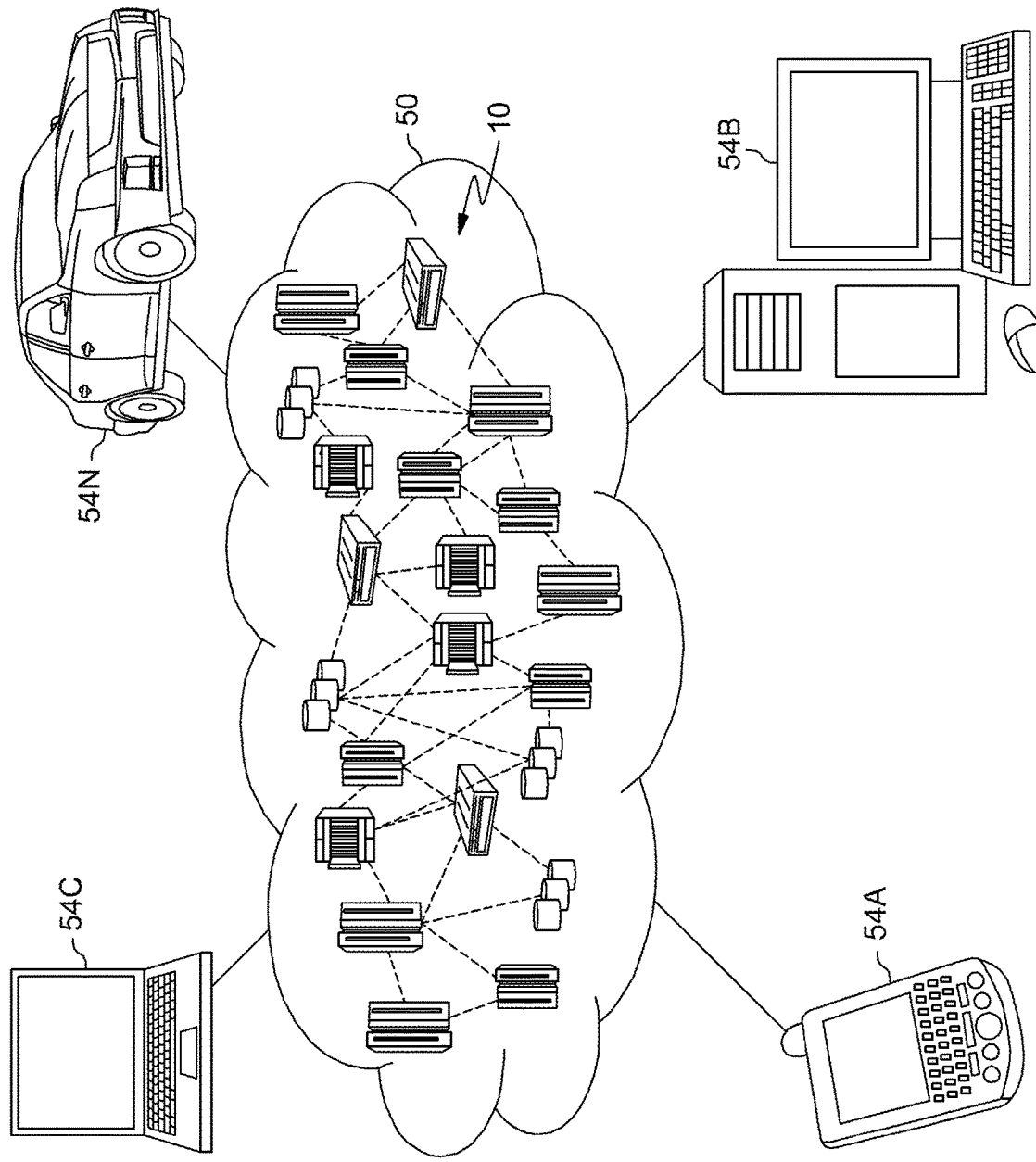
FIG. 10 is a block diagram of one example of a cloud computing environment, in accordance with one or more aspects of the present disclosure.
Figure 11:
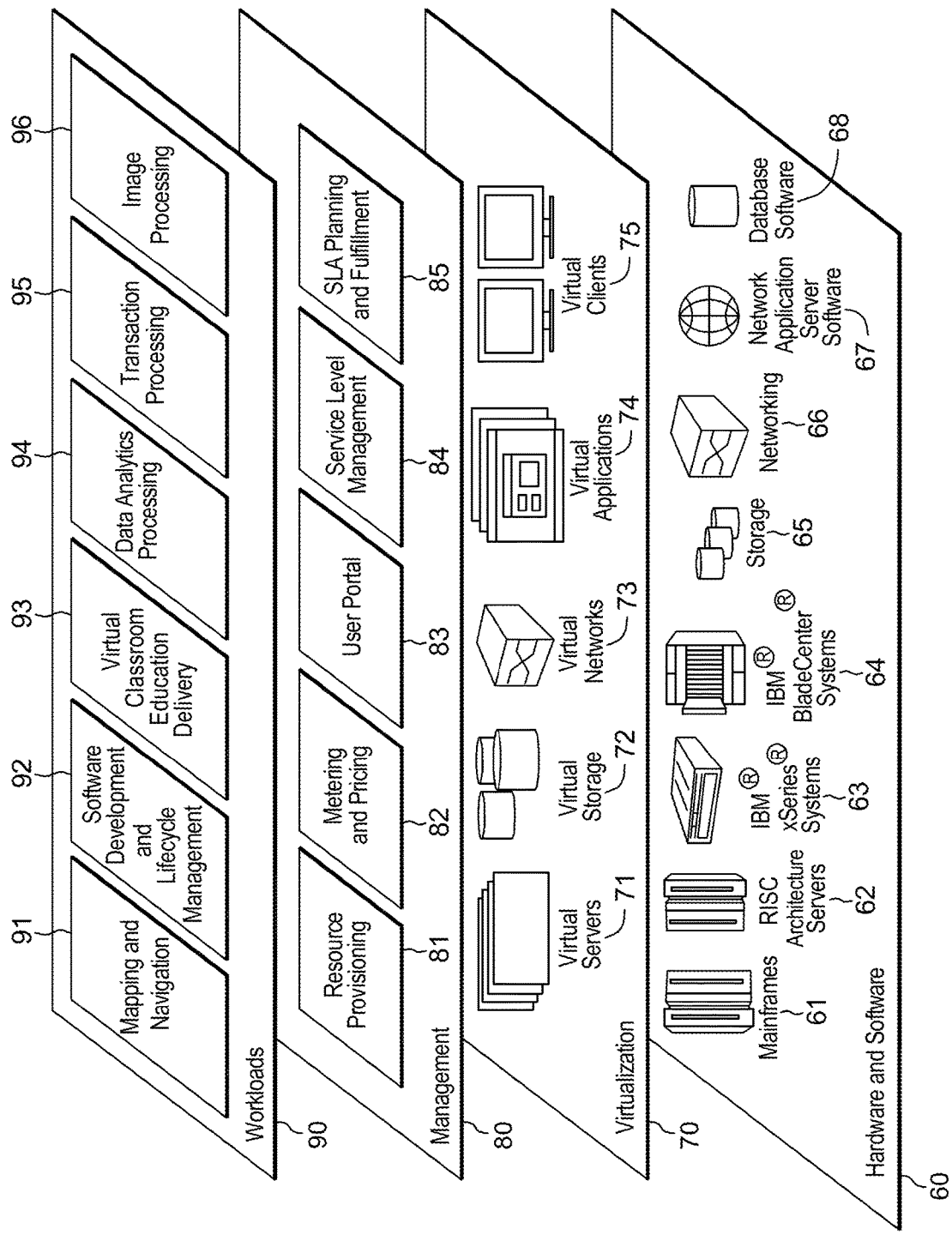
FIG. 11 is a block diagram of one example of functional abstraction layers of the cloud computing environment of FIG. 10, in accordance with one or more aspects of the present disclosure.

FIGS. 9-11 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 9, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 9, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 10-11.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. One or more program 40 including program processes 42 can define machine logic to carry out the functions set forth herein. In one embodiment, manager system 110 can include one or more computing node 10 and can include one or more program 40 for performing functions described with reference to method 100 of FIG. 1A and other functions described.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18.

It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18.

In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 10 computing node 10 is described as being implemented in a cloud computing environment and accordingly is referred to as a cloud computing node in the context of FIG. 10.

Referring now to FIG. 10, cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for establishing and updating geofence locations as set forth herein. The processing components 96 can be implemented with use of one or more program 40 described in FIG. 9.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer-implemented method of generating a graphical user interface based on image analysis, the method comprising:
cognitively analyzing, by a data processing system, an image to identify at least one item in the image, resulting in at least one identified item, wherein the at least one identified item is associated with one or more descriptor;

obtaining, by the data processing system, at least one available image filter based on the at least one identified item;
presenting, by the data processing system, one or more of the at least one available image filter to an end-user;
receiving, by the data processing system, a selection of an image filter from the one or more of the at least one image filter from the end-user;
applying, by the data processing system, an image overlay to the image, resulting in a composite image, the image overlay comprising the selection of an image filter as a selectable option; and
training the data processing system using one or more behavior of the end-user, wherein the training comprises employing cross-co-occurrence and wherein the obtaining is further based on the training.

2. The computer-implemented method of claim 1, wherein the obtaining comprises searching, by the data processing system, one or more database of items based on the one or more descriptor.

3. The computer-implemented method of claim 2, wherein the one or more descriptor comprises at least one of brand, size, color and product name.

4. The computer-implemented method of claim 1, wherein the image is preexisting.

5. The computer-implemented method of claim 1, wherein the cognitively analyzing comprises using visual recognition.

6. The computer-implemented method of claim 1, wherein the selectable option further comprises at least one of obtaining further information about an image filter, adding an image filter to a list, sharing an image filter and liking an image filter on social media.

7. The computer-implemented method of claim 6, wherein the image overlay further comprises at least one of a selector for further information, a selector for adding the image filter to a list, a selector for sharing the image filter and a selector for liking the image filter.

8. The computer-implemented method of claim 1, wherein the obtaining comprises:
receiving, by the data processing system, a list of one or more cognitively recommended item; and
comparing, by the data processing system, the one or more cognitively recommended item to one or more available image filter, resulting in at least one available image filter.

9. The computer-implemented method of claim 1, wherein the selectable option further comprises purchasing an item of the image filter, and wherein the image overlay further comprises a selector for purchasing the item of the image filter.

10. A system for generating a graphical user interface based on image analysis, the system comprising:
a memory; and
at least one processor in communication with the memory to perform a method, wherein the memory and the at least one processor are part of a data processing system, the method comprising:
cognitively analyzing, by the data processing system, an image to identify at least one item in the image, resulting in at least one identified item, wherein the at least one identified item is associated with one or more descriptor;
obtaining, by the data processing system, at least one available image filter based on the at least one identified item;
presenting one or more of the at least one available image filter to an end-user;
receiving, by the data processing system, a selection of an image filter from the one or more of the at least one image filter from the end-user;
applying, by the data processing system, an image overlay to the image, resulting in a composite image, the image overlay comprising the selection of an image filter as a selectable option; and
training the data processing system using one or more behavior of the end-user, wherein the training comprises employing cross-co-occurrence and wherein the obtaining is further based on the training.

11. The system of claim 10, wherein the obtaining comprises searching, by the data processing system, one or more database of items based on the one or more descriptor.

12. The system of claim 11, wherein the one or more descriptor comprises at least one of brand, size, color and product name.

13. The system of claim 10, wherein the obtaining comprises:
receiving, by the data processing system, a list of one or more cognitively recommended item; and
comparing, by the data processing system, the one or more cognitively recommended item to one or more available image filter, resulting in at least one available image filter.

14. A computer program product for generating a graphical user interface based on image analysis, the computer program product comprising:
a computer-readable storage medium readable by a processor and storing instructions for performing a method of sending notifications, the method comprising:
cognitively analyzing, by a data processing system, an image to identify at least one item in the image, resulting in at least one identified item, wherein the at least one identified item is associated with one or more descriptor;
obtaining, by the data processing system, at least one available image filter based on the at least one identified item;
presenting, by the data processing system, one or more of the at least one available image filter to an end-user;
receiving, by the data processing system, a selection of an image filter from the one or more of the at least one image filter from the end-user;
applying, by the data processing system, an image overlay to the image, resulting in a composite image, the image overlay comprising the selection of an image filter as a selectable option; and
training the data processing system using one or more behavior of the end-user, wherein the training comprises employing cross-co-occurrence and wherein the obtaining is further based on the training.

15. The computer program product of claim 14, wherein the obtaining comprises searching, by the data processing system, one or more database of items based on the one or more descriptor.

16. The computer program product of claim 15, wherein the one or more descriptor comprises at least one of brand, size, color and product name.

17. The computer program product of claim 14, wherein the obtaining comprises:
receiving, by the data processing system, a list of one or more cognitively recommended item; and comparing, by the data processing system, the one or more cognitively recommended item to one or more available image filter, resulting in at least one available image filter.

* * * * *